United States Patent [19]
Kobetz et al.

[11] 3,923,914
[45] Dec. 2, 1975

[54] CHEMICAL PROCESS
[75] Inventors: Paul Kobetz; Kenneth L. Lindsay, both of Baton Rouge, La.
[73] Assignee: Ethyl Corporation, Richmond, Va.
[22] Filed: July 2, 1973
[21] Appl. No.: 375,871

[52] U.S. Cl.............................................. 260/658 R
[51] Int. Cl.².......................................... C07C 17/20
[58] Field of Search ................................. 260/658 R

[56] References Cited
UNITED STATES PATENTS
2,553,518  5/1951  Lake et al...................... 260/658 R
2,675,413  4/1954  Ballard et al................... 260/658 R FOREIGN PATENTS OR APPLICATIONS
1,127,345  9/1968  United Kingdom............. 260/658 R

OTHER PUBLICATIONS

Technique of Organic Chemistry, Vol. VII, pp. 244, 249, Weisberger, Interscience Publishers, London (1955).

*Primary Examiner*—Delbert E. Gantz
*Assistant Examiner*—Joseph A. Boska
*Attorney, Agent, or Firm*—Donald L. Johnson; John F. Sieberth; Edgar E. Spielman, Jr.

[57] ABSTRACT

A process is disclosed for preparing dibromomethane from the reaction of, in the presence of an inert solvent, alkali metal bromide and dihalomethane.

10 Claims, No Drawings

CHEMICAL PROCESS

BACKGROUND OF THE INVENTION

Brominated hydrocarbons are very valuable compounds as they are truly of a multipurpose nature. For example, methylene bromide may be used as an ingredient in fire extinguishing fluids or as a fire retardant; it also may be used as a fluid for gauges and as a heavy liquid in solid separations based upon differences in specific gravity.

Recognizing the unique value of brominated hydrocarbons, many processes for their production have been developed. U.S. Pat. No. 1,891,415 discloses a method wherein bromine is reacted with aluminum in a closed system to form molten aluminum bromide which is then fed directly into reaction with a chlorinated hydrocarbon to form the brominated product. This method, however, suffers from the disadvantage that undesirable sludge is formed during the reaction of the aluminum bromide with the chlorinated hydrocarbon. The formation of sludge is avoided by the method of U.S. Pat. No. 2,120,675 wherein the aluminum bromide is dissolved in an inert solvent such as ethyl bromide prior to feeding the solution into reaction with the chlorinated hydrocarbon. This process, even though it avoids sludge formation, has the undesirable feature that a large proportion of inert solvent is employed which reduces the productive capacity of a reactor of any given size. Further, this reaction suffers from the disadvantage that it tends to stop far short of complete consumption of one or both reactants presumably because of a chemical equilibrium between the reactants and the products.

U.S. Pat. No. 2,553,518 discloses the production of organo bromine compounds by reacting hydrogen bromide and certain chlorinated organic compounds in the presence of an aluminum halide or borohalide catalyst. This method is said to overcome the problems mentioned in the earlier two processes; however, this process utilizes a catalyst which requires replacing and a hydrogen bromide reactant which is corrosive to conventional equipment.

Therefore, it is an object of this invention to provide a catalyst free process for the production of dibromomethane which does not suffer from any of the above mentioned disadvantages and which utilizes readily available, noncorrosive, inexpensive reactants.

THE INVENTION

This invention relates to a process for the production of dibromomethane by the reaction of alkali metal bromide and dihalomethane in the presence of an inert solvent comprising monoalkyl ether of alkylene glycol and water, wherein at least one of the halogens in the dihalomethane is chlorine and the remaining halogen is either chlorine or bromine, and wherein the alkali metal in the alkali metal bromide has an atomic number greater than 3.

When the dihalomethane is dichloromethane in the process of this invention the following equilibrium reactions take place:

1. 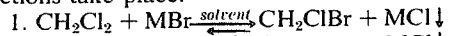
2. 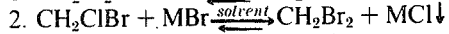

wherein M is an alkali metal having an atomic number greater than 3. If the dihalomethane is chlorobromomethane then equilibrium reaction (2) occurs. Prior to the discovery of the process of this invention the production of dibromomethane from the reaction of dichloro or chlorobromomethane and alkali metal bromide was fraught with difficulty as the equilibrium of the reaction(s) was shifted far to the left. It has now been discovered that the equilibrium of the reaction(s) can be shifted far to the right by the utilization of a unique solvent which results in high alkali metal bromide utilization, i.e., up to 60 percent.

Generally speaking, the solvent utilized in the process of this invention may be described as a solvent which is inert to the reaction mixture and which is capable of substantially dissolving the reactants and the brominated hydrocarbon products while not substantially dissolving the alkali metal chloride by-product. By not substantially dissolving the alkali metal chloride as it is produced it is theorized, though this invention is not limited to this theory, that the reaction(s) are driven to the right. A particularly useful solvent has been found to be one which comprises monoalkyl ether of alkylene glycol and water. Preferred monoalkyl ethers of alkylene glycol for this solvent are those in which the alkyl constituent contains up to three carbon atoms and in which the alkylene constituent(s) likewise contain up to three carbon atoms. Exemplary of such preferred glycols are monoethyl ether of diethylene glycol, monopropyl ether of triethylene glycol, monoethyl ether of ethylene glycol, monoethyl ether of propylene glycol, monoethyl ether of tripropylene glycol, monopropylene ether of dipropylene glycol, monomethyl ether of ethylene glycol, monomethyl ether of dipropylene glycol and the like. Most highly preferred glycols are monoethyl ether of ethylene glycol and monoethyl ether of diethylene glycol.

The volume ratio of the monoalkyl ether of alkylene glycol to the water is preferably within the range of from about 1:1 to about 3:1. Other volumetric ratios outside of this preferred range, however, may also be used. The main consideration in selecting the volumetric ratio is whether or not that particular ratio will enable the reactants and brominated products to be in solution while causing the alkali metal chloride by-product to be out of solution as a precipitate. Determination of any particular ratio therefore is easily achieved by simple tests utilizing the before mentioned criteria of solubility as the determinative factor of whether or not a particular volumetric ratio is desirable.

The amount of solvent used in the process of this invention should be that amount which dissolves the reactants and brominated products while at the same time maintaining the alkali metal chloride out of solution as a precipitate. Generally speaking, the amount of solvent used will be within the range of from about 1 ml to about 20 ml of solvent per gram of reactant used.

Illustrative of the benefits realized when practicing the process of this invention with its unique solvent are shown in Examples I and II. Examples III and IV are not of this invention and illustrate the low yields realized when not practicing the process of this invention.

EXAMPLE I

To a small test tube was added 1.0 g NaBr, 2.0 cc CH$_3$(OCH$_2$CH$_2$)$_2$OH, 1.0 cc H$_2$O and 0.4 g CH$_2$Cl$_2$. The tube was then sealed so as to prevent evaporation of any of the ingredients during the reaction period. The sealed tube was then placed in an oil bath at 140°C for 1½ hours. After this period of time the tube was cooled to room temperature. The seal of the tube was broken and the ingredients removed. A sodium chloride precipitate was noticed and was removed by filtration. The remaining solid-free filtrate was subjected to NMR analyses. The analysis showed that the dihalomethane content was 15 mole percent $CH_2Br_2$, 55 mole percent $CH_2ClBr$, and 35 mole percent $CH_2Cl_2$. This yield represents a 42.5 percent conversion of sodium bromide.

EXAMPLE II

The procedure of Example I was followed except that 1.0 NaBr, 0.3 g $CH_2Cl_2$, 2.0 cc $CH_3OCH_2CH_2OH$, and 1.0 cc $H_2O$ was added to the test tube. By the analysis it was shown that the dihalomethane content comprised 32 mole percent $CH_2Br_2$, 45 mole percent $CH_2ClBr$, and 37 mole percent $CH_2Cl_2$. This yield corresponds to a 54.5 percent conversion of the sodium bromide used.

EXAMPLE III

The procedure of Example I was followed except that 2.2 g NaBr, 1.0 g $CH_2Cl_2$, and 2.0 cc $H_2O$ were added to the test tube. No precipitate was noticed at the end of the reaction period and the resultant liquid was nonhomogenous. The organic phase was separated and the analysis thereof showed that it comprised 10 mole percent $CH_2Br_2$, 24 mole percent $CH_2ClBr$, and 66 mole percent $CH_2Cl_2$. This yield corresponds to 22 percent conversion of the sodium bromide used.

EXAMPLE IV

The procedure of Example II was repeated except that no water was added to the test tube. By analysis it was shown that the dihalomethane content comprises 17 mole percent $CH_2Br_2$, 46 mole percent $CH_2ClBr$, and 37 mole percent $CH_2Cl_2$. This yield corresponds to a 40 percent conversion of the sodium bromide used. This yield is about 15 percent lower than the yield of Example II in which the solvent of this invention was utilized.

The temperature at which the process of this invention may be operated is within the range of from about 100° to about 175° C. A preferred temperature range is from about 130° to about 160°C. The system pressure should be one which avoids boiling of the reaction mixture, i.e., the mixture of reactants, solvent and products. Generally speaking, pressures which correspond to the vapor pressure of the reaction mixture at the reaction temperature are suitable. Pressures much greater than those which are needed to avoid boiling may of course be used, however no particular benefit is realized to offset the usual higher cost for such high pressures.

In the process of this invention the alkali metal bromide reactant may be supplied as either a solid or in solution, e.g., a water solution. Since aqueous sodium bromide (10–60 percent solution) is readily available at a low cost from various industries as waste streams, the utilization of such solutions is preferred. Another advantage of using an aqueous solution is that the water present therein may be used to supply part or all of the water requirements for the solvent. In whatever form the alkali metal bromide is supplied, be it in solution or in the solid form, the preferred bromides are those of sodium, potassium, and mixtures thereof due to considerations of expense and availability. Sodium bromide is most preferred.

Quantitatively speaking, the reactants utilized in this invention can be used in stoichiometric quantities with an excess in the amount of alkali metal bromide being preferred. Alkali metal bromide quantities which are about two times the stoichiometric amount are highly preferred as such amounts aid in keeping the reaction equilibrium shifted to the right.

No particular order of addition for the reactants is required. For example, the alkali metal bromide may be added to the dihalomethane used or vice versa with no criticality being found. The reactants and solvent should be added and thus mixed together at room conditions as the dihalomethanes are liquid at these conditions and are therefore easy to handle. After the reactants have been added, one to the other, and the appropriate reaction conditions are achieved, a reaction period of from about ½ to about 5 hours should be allowed so as to enable the reactions to reach equilibrium.

After the reaction has reached equilibrium, it may be desired to recover the methylene bromide in essentially pure form. Such recovery can be accomplished by removing the alkali metal chloride precipitate from the liquid reaction products, solvent and unreacted reactants, if any, by any of the solidliquid separation methods known to those skilled in the art, e.g., filtration, decantation, centrifugation, etc. After removal of the alkali metal chloride precipitate, the resultant precipitate-free liquid is then distilled so as to separate the brominated products and any unreacted dihalomethane reactant remaining from the solvent and alkali metal bromide. The alkali metal bromide and solvent may be sent to recycle after separation to be utilized as a source of solvent and reactant in subsequent reactions. The resultant brominated product and dihalomethane reactant mixture will contain some water as water and this mixture form an azeotrope. The water, however, is easily removed as it will form a separate liquid phase. The methylene bromide can then be separated from the dihalomethane reactant and any chlorobromomethane product by distillation. The temperatures and pressures and number of distillations to affect such separation are readily determined by those skilled in the art. The separated dihalomethane reactant and the chlorobromomethane product may be recycled to subsequent reactions to be used as reactants therein for best economy.

The bromination of halogenated hydrocarbons other than the dihalomethane mentioned above may be affected by the process of this invention. Some of these halogenated hydrocarbons which may be brominated are, carbon tetrachloride, 1,1,1-trichloroethane, 1,1-dichlorobutene, perchloroethylene, trichloroethylene, 1,2-dichloropentane, 1,1-dibromo-2,3-dichloroethane, 1-bromo-2,3,4,5-tetrachlorononane, and the like.

We claim:

1. A catalyst free process for the production of dibromomethane and by-product alkali metal chloride comprising reacting, at a temperature within the range of from about 100° to about 175°C and in the presence of an inert solvent, alkali metal bromide and dihalomethane wherein at least one of the halogen constituents of the dihalomethane is chlorine and the remaining halogen is either chlorine or bromine, and the alkali metal constituent of the alkali metal bromide has an atomic number greater than 3 and wherein the dibromomethane and reactants are soluble in the solvent but in which solvent the alkali metal by-product is substantially insoluble and the solvent consists essentially of a mixture of monoalkyl ether of alkylene glycol and water in a volume ratio within the range of from about 1:1 to about 3:1 of the monoalkyl ether of alkylene glycol to water.

2. The process of claim 1 wherein the alkyl constituent and the alkylene constituent of the monoalkyl ether of alkylene glycol each contain up to 3 carbon atoms.

3. The process of claim 1 wherein the monoalkyl ether of alkylene glycol is monoethyl ether of ethylene glycol or monoethyl ether of diethylene glycol.

4. The process of claim 1 wherein the dihalomethane is methylene chloride.

5. The process of claim 1 wherein the alkali metal bromide is sodium bromide or potassium bromide.

6. The process of claim 1 wherein the alkali metal bromide is sodium bromide supplied as aqueous sodium bromide.

7. The process of claim 1, wherein the alkali metal bromide is initially present in amounts of about two times the stoichiometric amount.

8. The process of claim 1 wherein the temperature is within the range of from about 130° to about 160°C.

9. The process of claim 8 wherein the monoalkyl ether of alkylene glycol is monoethyl ether of ethylene glycol or monoethyl ether of diethylene glycol.

10. The process of claim 1 wherein the alkali metal bromide is initially present in an amount of about 2 times the stoichiometric amount, the alkali metal bromide is sodium bromide or potassium bromide, the monoalkyl ether of alkylene glycol is monoethyl ether of ethylene glycol or monoethylene ether of diethylene glycol, the temperature is within the range of from about 130° to about 160°C, and wherein the dihalomethane is methylene chloride.

* * * * *